United States Patent
Wu et al.

(10) Patent No.: US 12,174,429 B2
(45) Date of Patent: Dec. 24, 2024

(54) OPTICAL-FIBER CONNECTOR WITH A PROTECTIVE CAP AND STANDARD CONNECTOR

(71) Applicant: ACON OPTICS COMMUNICATIONS INC., New Taipei (TW)

(72) Inventors: Jia-Rong Wu, New Taipei (TW); Tsung-Yao Hsu, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 68 days.

(21) Appl. No.: 17/808,697

(22) Filed: Jun. 24, 2022

(65) Prior Publication Data
US 2023/0417999 A1 Dec. 28, 2023

(51) Int. Cl.
*G02B 6/38* (2006.01)

(52) U.S. Cl.
CPC ......... *G02B 6/3825* (2013.01); *G02B 6/3849* (2013.01); *G02B 6/3873* (2013.01)

(58) Field of Classification Search
CPC ....................................................... G02B 6/38
USPC .......................................................... 385/88
See application file for complete search history.

(56) References Cited

U.S. PATENT DOCUMENTS

| | | | |
|---|---|---|---|
| 4,852,963 A * | 8/1989 | Lampert | G02B 6/3888 385/60 |
| 5,067,783 A * | 11/1991 | Lampert | G02B 6/3877 385/60 |
| 5,082,345 A * | 1/1992 | Cammons | G02B 6/266 385/140 |
| 5,129,023 A * | 7/1992 | Anderson | G02B 6/3874 385/60 |
| 7,942,590 B2 * | 5/2011 | Lu | G02B 6/3816 385/78 |
| 11,892,686 B2 * | 2/2024 | Barnette, Jr. | G02B 6/387 |
| 11,892,687 B2 * | 2/2024 | Rosson | G02B 6/3825 |
| 2003/0063867 A1 * | 4/2003 | McDonald | G02B 6/3897 385/76 |
| 2003/0215190 A1 * | 11/2003 | Lampert | G02B 6/3812 385/76 |
| 2006/0269194 A1 * | 11/2006 | Luther | G02B 6/3863 385/85 |
| 2009/0148101 A1 * | 6/2009 | Lu | G02B 6/3821 385/56 |
| 2009/0148103 A1 * | 6/2009 | Lu | G02B 6/3894 385/60 |
| 2014/0029900 A1 * | 1/2014 | Logan, Jr. | G02B 6/3821 29/874 |

(Continued)

*Primary Examiner* — Kaveh C Kianni
(74) *Attorney, Agent, or Firm* — INNOVATION CAPITAL LAW GROUP, LLP; Vic Lin

(57) ABSTRACT

An optical-fiber connector with protective cap includes a connector body and a retaining member which are fitted over an optical-fiber sleeve member, a fixation member, and a spring. The protective cap is fitted over the retaining member and the connector body. Each second engaging portion of the protective cap is engaged with a corresponding first engaging portion of the connector body. After the protective cap draws the optical-fiber connector to pass through a guiding pipeline, the protective cap is removed, and the optical-fiber connector is assembled with a fixation sleeve and a coupling cap to form a standard connector.

14 Claims, 9 Drawing Sheets

(56) References Cited

U.S. PATENT DOCUMENTS

| | | | | |
|---|---|---|---|---|
| 2014/0241670 | A1* | 8/2014 | Barnette, Jr. | G02B 6/3871 |
| | | | | 29/505 |
| 2015/0293310 | A1* | 10/2015 | Kanno | G02B 6/3891 |
| | | | | 385/78 |
| 2016/0187590 | A1* | 6/2016 | Lu | G02B 6/3894 |
| | | | | 385/78 |
| 2017/0068064 | A1* | 3/2017 | Cheng | G02B 6/545 |
| 2017/0139158 | A1* | 5/2017 | Coenegracht | G02B 6/3851 |
| 2017/0238822 | A1* | 8/2017 | Young | A61B 5/0084 |
| 2017/0299817 | A1* | 10/2017 | Huang | G02B 6/3888 |
| 2018/0045894 | A1* | 2/2018 | Takahashi | G02B 6/3877 |
| 2019/0179083 | A1* | 6/2019 | Wang | G02B 6/3862 |
| 2020/0257059 | A1* | 8/2020 | Hill | G02B 6/3825 |
| 2020/0319420 | A1* | 10/2020 | Cams | G02B 6/4454 |
| 2020/0408998 | A1* | 12/2020 | Iizumi | G02B 6/3857 |
| 2021/0132300 | A1* | 5/2021 | Isenhour | G02B 6/3875 |
| 2021/0141169 | A1 | 5/2021 | Leeson et al. | |
| 2021/0141185 | A1* | 5/2021 | Geens | G02B 6/3874 |
| 2021/0173156 | A1* | 6/2021 | Claver | G02B 6/3894 |
| 2022/0128773 | A1* | 4/2022 | Lu | G02B 6/3831 |
| 2022/0221658 | A1* | 7/2022 | Lu | G02B 6/3849 |
| 2023/0280542 | A1* | 9/2023 | Li | G02B 6/3893 |
| | | | | 385/78 |
| 2023/0314727 | A1* | 10/2023 | Etheridge | G02B 6/3893 |
| | | | | 385/56 |

\* cited by examiner

OPTICAL-FIBER CONNECTOR WITH A PROTECTIVE CAP AND STANDARD CONNECTOR

FIELD OF THE INVENTION

The instant disclosure relates to a connector, and more particular to an optical-fiber connector with a protective cap and a standard connector.

BACKGROUND

The optical fiber is an tool for optical transmission. An optical-fiber connector is used for connecting the optical fiber with different electronic devices, so that the electronic devices can utilize the signals transmitted by the optical fiber.

To meet requirements of home optical fiber networks (or fiber optic networks), optical-fiber connectors have to be arranged within the building construction to meet requirements of home optical fiber network (or fiber optic network). For example, the optical-fiber connector has to pass through the pipelines or the channels inside the building construction for the arrangement. As known to the inventor, an optical-fiber connector is connected to the cable through a protective cap, and a connector head is moved from one end of the pipeline to the other end of the pipeline by pushing so as to be connected to the cable. The connector head includes an insertion core member, a seat member, a limiting sleeve member, a spring, and a tail cap which are assembled with each other. The limiting sleeve member of the connector head has an outer thread, the protective cap has an inner thread, and the outer thread is threaded with the inner thread, so that the limiting sleeve member of the connector head is connected and fixed to the protective cap.

SUMMARY OF THE INVENTION

In view of these, an embodiment of the instant disclosure provides an optical-fiber connector with protective cap. The optical-fiber connector comprises an optical-fiber sleeve member, a fixation member, a spring, a connector body, a retaining member, and a protective cap. The optical-fiber sleeve member is connected to one end of the fixation member. The spring is fitted over the fixation member. The connector body is fitted over the fixation member and the spring. The connector body has a plurality of first engaging portions. The retaining member is fitted over the optical-fiber sleeve member and engaged with the connector body. The protective cap has a receiving groove. One of two ends of the protective cap has a connection portion, and the other end of the protective cap has an insertion opening. An inner wall of the insertion opening has a plurality of second engaging portions. The protective cap is fitted over the optical-fiber sleeve member, the retaining member, and the connector body. Each of the second engaging portions is engaged with a corresponding one of the first engaging portions.

In some embodiments, each of two sides of the inner wall of the insertion opening comprises a flexible wall, a plurality of guiding grooves is between the flexible walls, and each of the second engaging portions is at an inner side of a corresponding one of the flexible walls.

In some embodiments, the flexible walls comprise a plurality of thicker portions and a plurality of thinner portions. In each of the flexible walls, the thinner portions are at two sides of the thicker portion and adjacent to the guiding grooves.

In some embodiments, each of the first engaging portions is a curved protrusion, and each of the second engaging portions is a curved recess. Each of the curved recesses is at an inner side of a corresponding one of the flexible walls, and each of the curved protrusions is engaged with a corresponding one of the curved recesses.

In some embodiments, each of two sides of each of the curved recesses has a guiding bevel, and each of the guiding bevels contacts a corresponding of the curved protrusions.

In some embodiments, each of the first engaging portions is detachably engaged with the corresponding one of the second engaging portions through an axial rotational operation of the connector body, so that each of the first engaging portions is rotated from an engaged position to a detached position; when each of the first engaging portions is at the engaged position, the first engaging portion corresponds to the corresponding one of the second engaging portions which is at the inner side of a corresponding one of the flexible walls. When each of the first engaging portions is at the detached position, the first engaging portion corresponds to a corresponding one of the guiding grooves.

In some embodiments, an outer end of the insertion opening has a plurality of guiding portions, each of the guiding portions is at an outer end portion of a corresponding one of the flexible walls, a side portion of each of the first engaging portions has a chamfered structure, and each of the chambered structures contacts a corresponding one of the guiding portions.

In some embodiments, the optical-fiber connector further comprises a dustproof cap. The dustproof cap is fitted over the optical-fiber sleeve member, and one end of the dustproof cap contacts an inner wall of the receiving groove of the protective cap.

In some embodiments, the receiving groove of the protective cap is cone-shaped, and a diameter of the insertion opening gradually decreases toward an interior of the receiving groove.

According to one or some embodiments of the instant disclosure, a standard connector is provided. The standard connector comprises an optical-fiber sleeve member, a fixation member, a spring, a connector body, a retaining member, a fixation sleeve, and a coupling cap. The optical-fiber sleeve member is connected to one end of the fixation member. The spring is fitted over the fixation member. The connector body is fitted over the fixation member and the spring. The connector body has a plurality of first engaging portions. The retaining member is fitted over the optical-fiber sleeve member and engaged with the connector body. The fixation member has a mating opening. An inner wall of the mating opening has a plurality of mating portions. The fixation sleeve is fitted over the optical-fiber sleeve member, the fixation member, and the connector body. Each of the mating portions is engaged with a corresponding one of the first engaging portions. The coupling cap is fitted over the fixation sleeve.

Based on the above, according to some embodiments of the instant disclosure, after assembling the protective cap with the optical-fiber connector, the protective cap and the optical-fiber connector are drawn by tools to pass through the guiding pipeline to achieve the drawing of the optical-fiber connector. According to some embodiments, each of the second engaging portions of the protective cap is engaged with the corresponding one first engaging portion of the connector body, so that the protective cap and the optical-fiber connector are assembled to be an assembly. Therefore, the structural strength and the product rigidity of the assembly can be increased, so that the assembly can bear the pulling force upon the assembly is pulled to have a long-distance movement. According to some embodiments, upon assembling the protective cap to the optical-fiber connector, the dustproof cap on the optical-fiber connector does not need to be detached and is assembled in the protective cap. Therefore, the assembling of the protective cap and the optical-fiber connector is convenient. According to some embodiments, after the optical-fiber connector is assembled with the protective cap, the outer diameter of the cross sectional of the assembly can be reduced efficiently. Therefore, the assembly is small and has a smaller space ratio, and the optical-fiber connector can pass through a guiding pipeline have an outer diameter of 6.5 mm.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
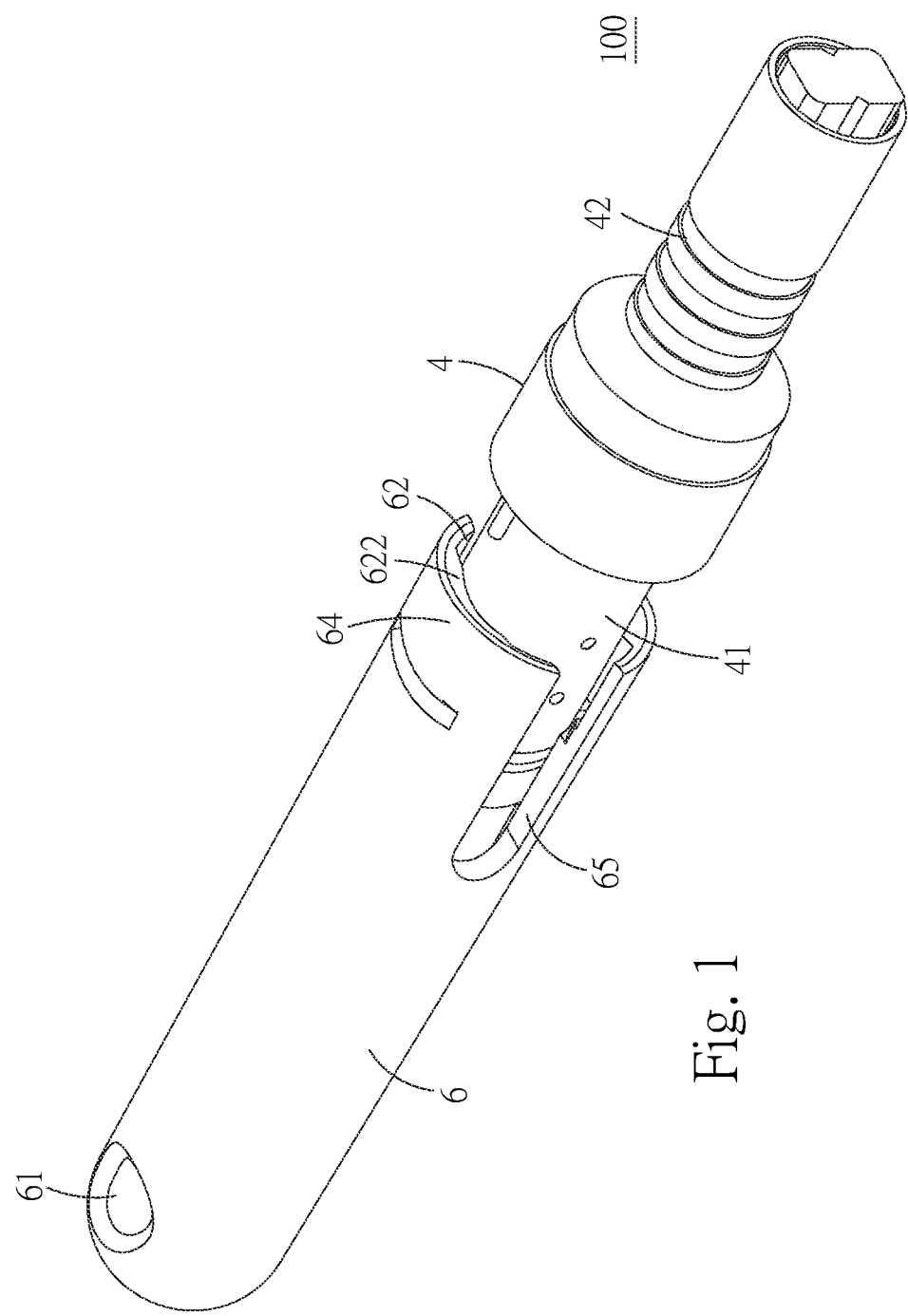
FIG. 1 illustrates a perspective view of an assembly of an optical-fiber connector and a protective cap according to some embodiments of the instant disclosure, where the protective cap is fitted over the optical-fiber connector.

Please refer to FIG. 1. FIG. 1 illustrates a perspective view of an assembly of an optical-fiber connector 100 and a protective cap 6. In some embodiments, the optical-fiber connector 100 is adapted to be utilized in Fiber to the x (FTTx), Fiber to the Home (FTTH), or Fiber to the Room (FTTR) arrangements. The FTTR arrangement is a new coverage mode of the home networks in this gigabyte (GB) era. Under the FTTR arrangement, with the basis of the Fiber to the Building (FTTB) arrangement and the FTTH arrangement, the optical fibers are further introduced into each of the rooms in the house, so that every room can have a GB-scale surfing speed with the optical fibers.

Figure 2:
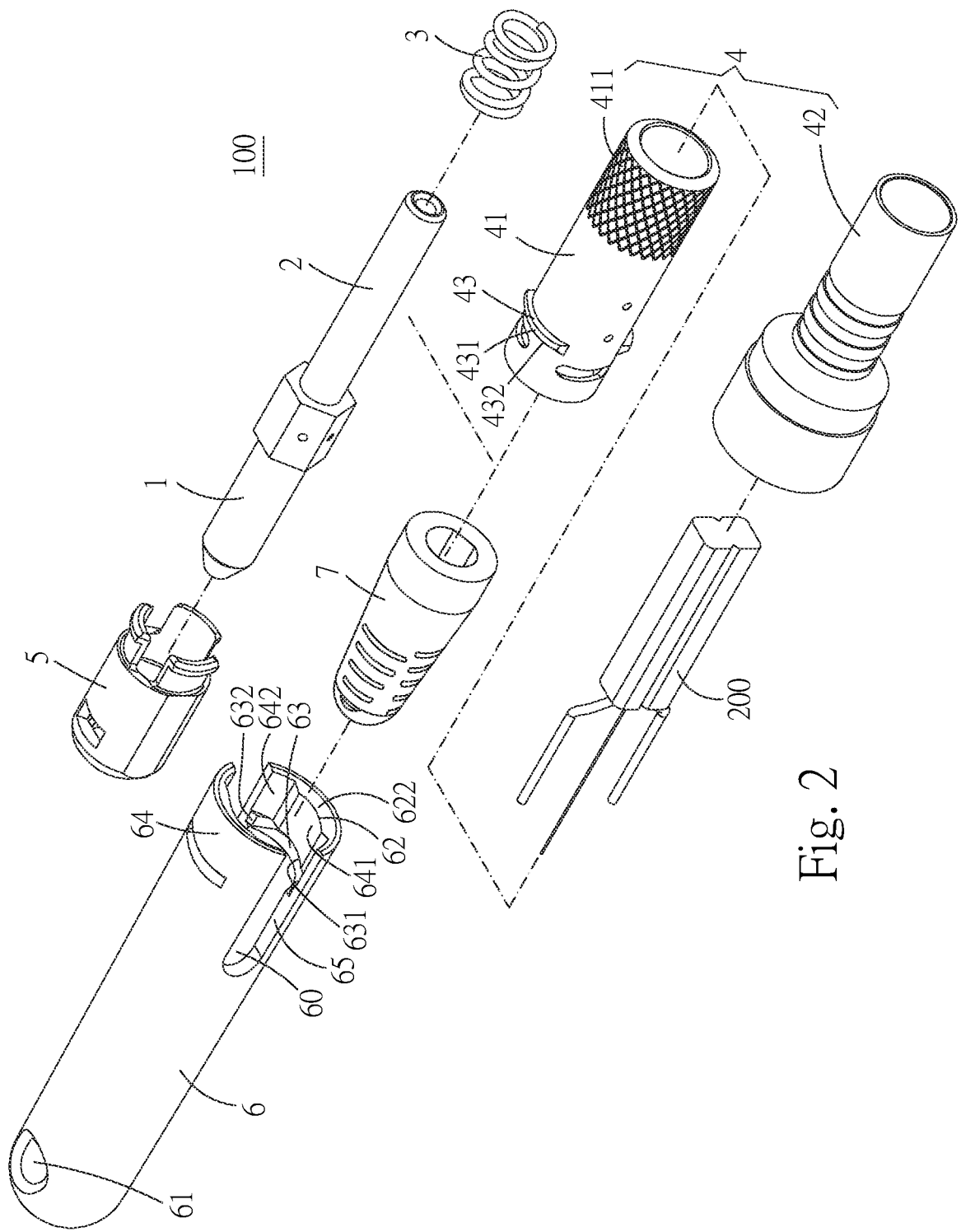
FIG. 2 illustrates an exploded view of an assembly of the optical-fiber connector and the protective cap according to some embodiments of the instant disclosure.

Please refer to FIG. 2. FIG. 2 illustrates an exploded view of an assembly of the optical-fiber connector 100 and the protective cap 6. In some embodiments, the optical-fiber connector 100 with the protective cap 6 comprises an optical-fiber sleeve member 1, a fixation member 2, a spring 3, a connector body 4, a retaining member 5, and a protective cap 6. The optical-fiber sleeve member 1 is connected to one end of the fixation member 2. The spring 3 is fitted over the fixation member 2. The connector body 4 is fitted over the fixation member 2 and the spring 3. The connector body 4 has a plurality of first engaging portions 43. The retaining member 5 is fitted over the optical-fiber sleeve member 1 and engaged with the connector body 4. The protective cap 6 has a receiving groove 60. One of two ends of the protective cap 6 has a connection portion 61, and the other end of the protective cap 6 has an insertion opening 62. An inner wall of the insertion opening 62 has a plurality of second engaging portions 63. The protective cap 6 is fitted over the optical-fiber sleeve member 1, the retaining member 5, and the connector body 4, and each of the second engaging portions 63 is engaged with a corresponding one of the first engaging portions 43. The protection cap 6 is used to pull the optical-fiber connector 100 to pass through a pipeline and to protect a core of the optical-fiber connector 100.

Figure 3:
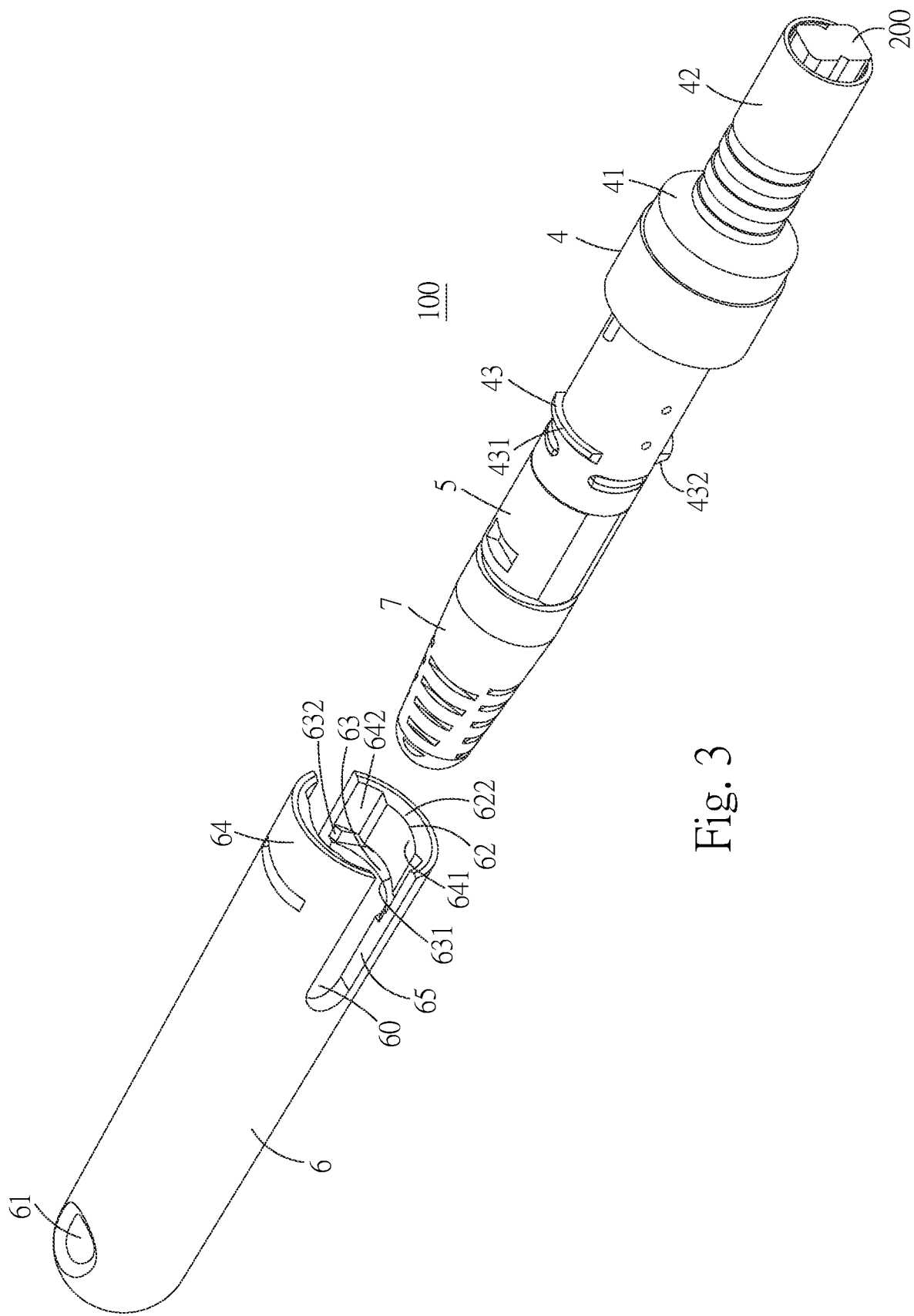
FIG. 3 illustrates a schematic perspective view showing the optical-fiber connector is assembling with the protective cap according to some embodiments of the instant disclosure.
Figure 4:
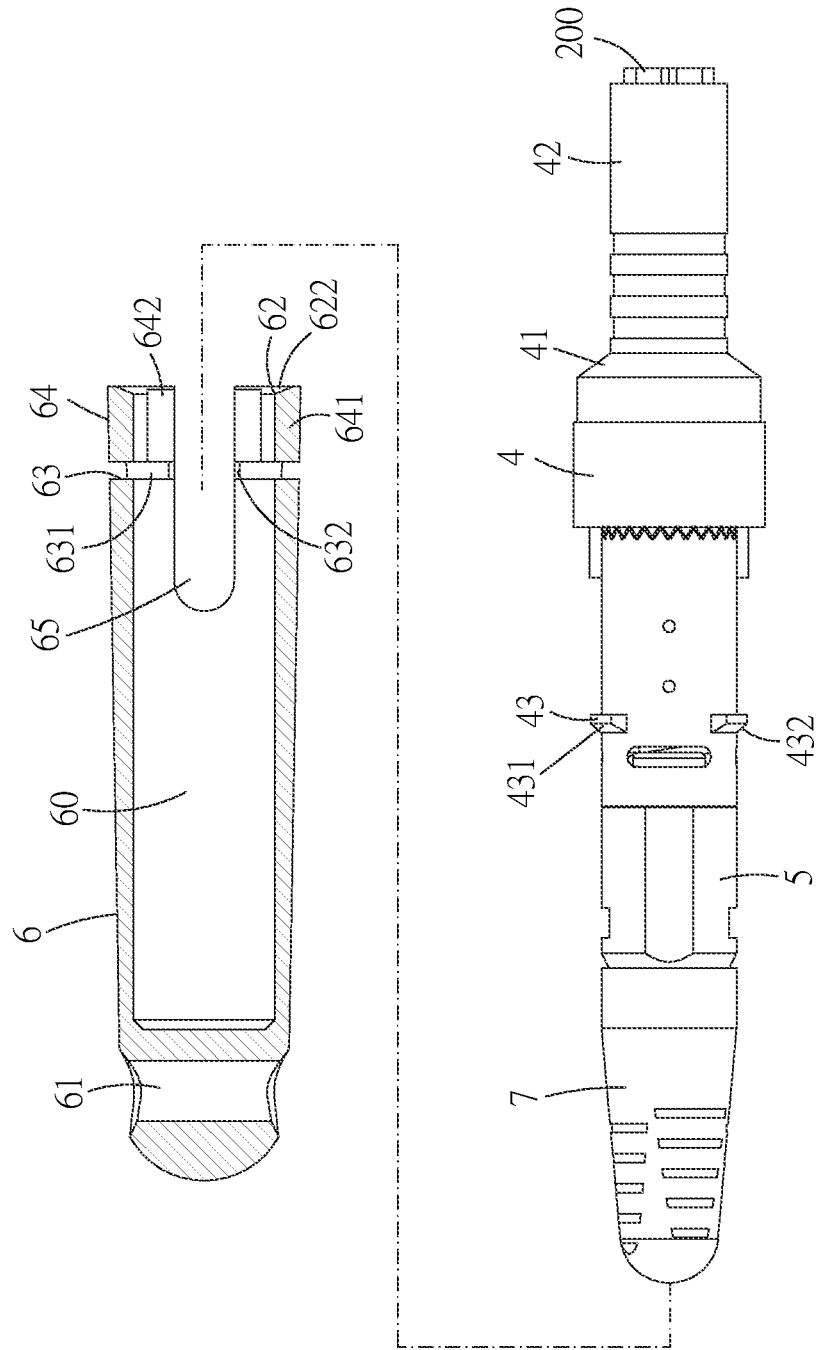
FIG. 4 illustrates a schematic lateral cross-sectional view showing the optical-fiber connector is assembling with the protective cap according to some embodiments of the instant disclosure.

Please refer to FIG. 3 and FIG. 4. FIG. 3 illustrates a schematic perspective view showing the optical-fiber connector 100 is assembling with the protective cap 6. FIG. 4 illustrates a schematic lateral cross-sectional view showing the optical-fiber connector 100 is assembling with the protective cap 6. After the optical-fiber sleeve member 1, the fixation member 2, the spring 3, the connector body 4, and the retaining member 5 are assembled with each other, the assembling of the optical-fiber connector 100 is achieved. Then, the optical-fiber connector 100 is aligned with the insertion opening 62 of the protective cap 6 and inserted into the receiving groove 60, so that each of the first engaging portions 43 (protruding flange structures) of the connector body 4 is engaged with a corresponding one of the second engaging portions 63 (recess structures shown in FIG. 5 to FIG. 7) of the protective cap 6. Therefore, each of the second engaging portions 63 of the protective cap 6 is engaged with the corresponding one first engaging portion 43 of the connector body 4, so that the protective cap 6 and the optical-fiber connector 100 are assembled to be an assembly. Therefore, the structural strength and the product rigidity of the assembly can be increased, so that the assembly can bear the pulling force upon the assembly is pulled to have a long-distance movement.

Please refer to FIG. 2. In some embodiments, the connector body 4 is a hollow tubular member. A diameter of one end of the connector body 4 having recessed holes is larger, so that a cable 200 can be inserted into the connector body 4 easily. In some embodiments, the connector body 4 comprises a base 41 and a crimp ring 42. The crimp ring 42 is fitted over an outer surface of the base 41, and the outer surface of the base 41 has a rough surface 411 with a grid pattern, so that the base 41 can be mated with the crimp ring 42 properly. The cable 200 is connected to the crimp ring 42.

Figure 5:
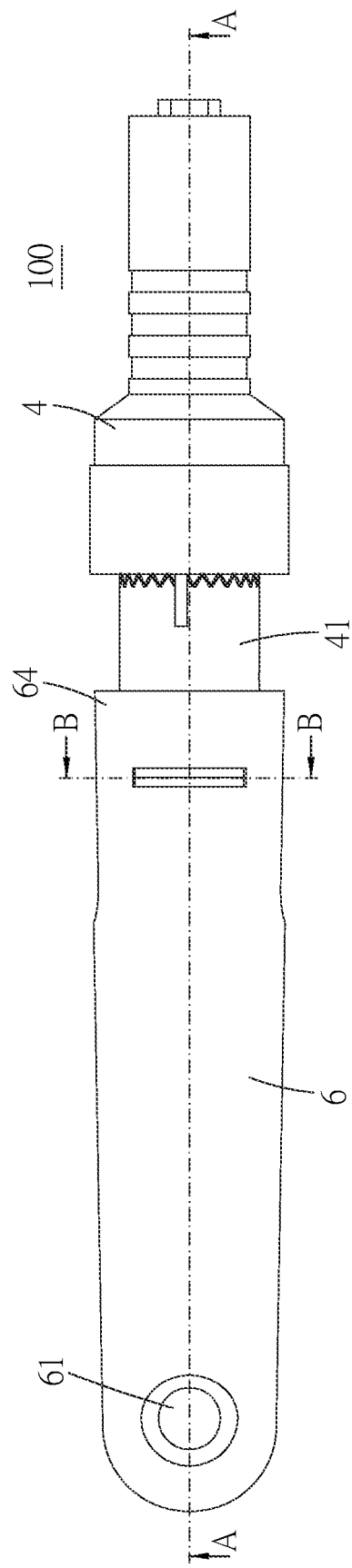
FIG. 5 illustrates a schematic top view showing the optical-fiber connector is assembled with the protective cap according to some embodiments of the instant disclosure.
Figure 6:
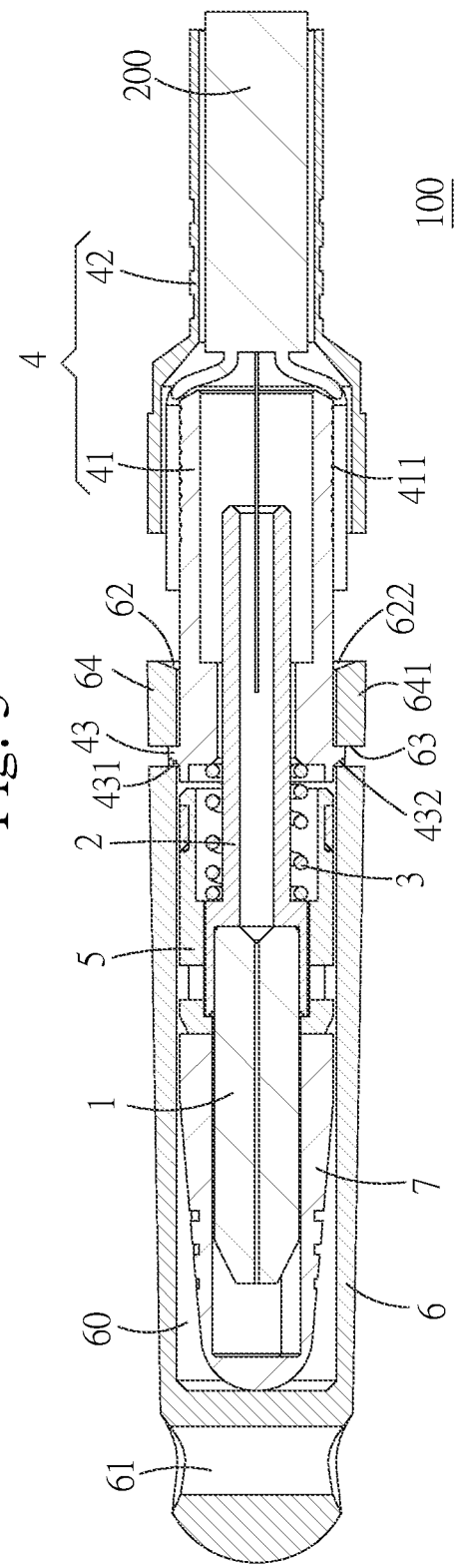
FIG. 6 illustrates a cross-sectional view along the line A-A shown in FIG. 5.

Please refer to FIG. 5 and FIG. 6. FIG. 5 illustrates a schematic top view showing the optical-fiber connector 100 is assembled with the protective cap 6. FIG. 6 illustrates a cross-sectional view along the line A-A shown in FIG. 5. In some embodiments, after the optical-fiber connector 100 is assembled with the protective cap 6, the maximum outer diameter of the cross section of the assembly is less than 6.5 mm. Therefore, after the optical-fiber connector 100 is assembled with the protective cap 6, the outer diameter of the cross sectional of the assembly can be reduced efficiently. Therefore, the assembly is small and has a smaller space ratio. In some embodiments, a steel wire is utilized to pass through the connection portion 61 (through hole) at one end of the protective cap 6. When the steel wire is pulled, the protective cap 6 and the optical-fiber connector 100 are drawn to pass through a guiding pipeline have an outer diameter of 6.5 mm. Therefore, the protective cap 6 and the optical-fiber connector 100 pass from one end of the guiding pipeline to the other end of the guiding pipeline, so that the cable 200 can pass through the guiding pipeline to achieve the cable arrangement.

Please refer to FIG. 5 and FIG. 6. In some embodiments, after the optical-fiber sleeve member 1, the fixation member 2, the spring 3, the connector body 4, and the retaining member 5 are assembled with each other, one end of the retaining member 5 is exposed from the optical-fiber sleeve member 1, and a dustproof cap 7 is fitted over the retaining member 5. Then, the optical-fiber connector 100 is aligned with the insertion opening 62 of the protective cap 6 and inserted into the receiving groove 60, and the protective cap 6 is fitted over the dustproof cap 7, so that an inner wall of the protective cap 6 contacts a top portion of the dustproof cap 7. Therefore, during the process that the protective cap 6 and the optical-fiber connector 100 pass through the guiding pipeline, the dustproof cap 7 does not need to be removed. Hence, the implementation of the cable arrangement can be achieved conveniently.

Please refer to FIG. 5 and FIG. 6. In some embodiments, the shape of the protective cap 6 is like a bullet. The protective cap 6 is cone-shaped, the receiving groove 60 is cone-shaped, and a diameter of the insertion opening 62 gradually decreases toward an interior of the receiving groove 60. The diameter of the insertion opening 62 and an inner diameter of the receiving groove 60 gradually decrease. In some embodiments, the dustproof cap 7 is cone-shaped, and the dustproof cap 7 has a tapered outline (a diameter of an outer surface of the dustproof cap 7 gradually decreases from the top portion to a bottom portion of the dustproof cap 7). The tapered outline of the dustproof cap 7 allows the dustproof cap 7 to be assembled into the receiving groove 60 of the protective cap 6 conveniently.

Please refer to FIG. 2 and FIG. 4. In some embodiments, each of the first engaging portions 43 of the connector body 4 is a curved protrusion 431, each of the second engaging portions 63 of the protective cap 6 is a curved recess 631, and each of the curved recesses 631 is at an inner side of a corresponding one of the flexible walls 64.

Figure 7:
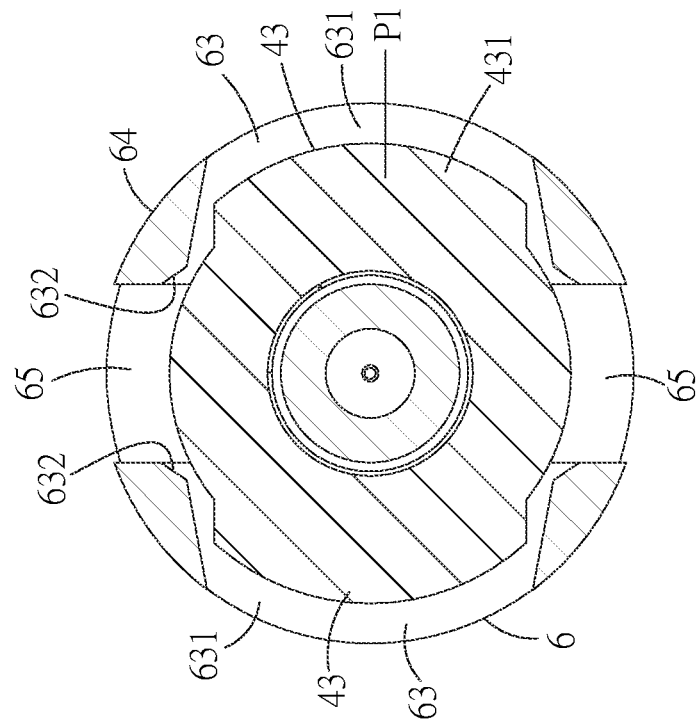
FIG. 7 illustrates a cross-sectional view along the line B-B shown in FIG. 5.
Figure 8:
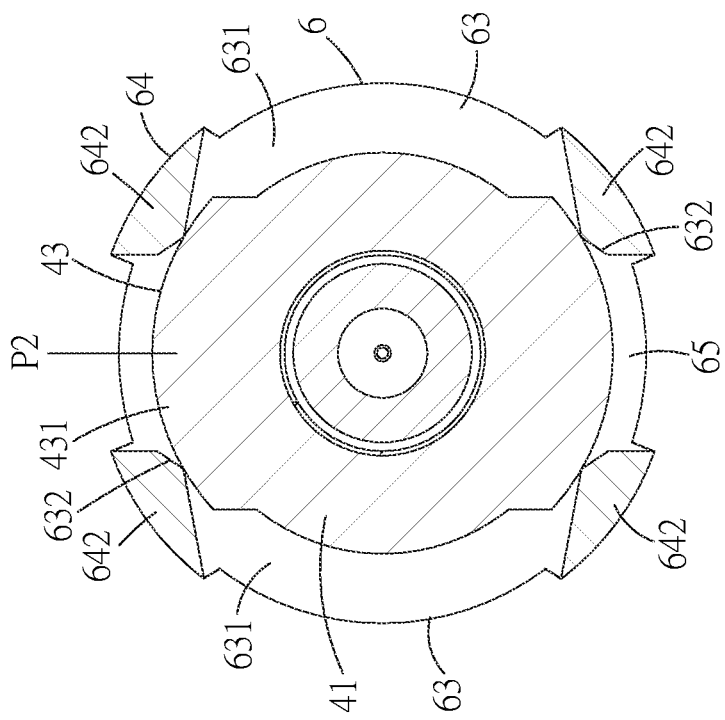
FIG. 8 illustrates a cross-sectional view showing the connector body is detached from the protective cap from the viewing angle of FIG. 7.

Please refer to FIG. 2 and FIG. 4. In some embodiments, each of two sides of the inner wall of the insertion opening 62 of the protective cap 6 comprises a flexible wall 64, a plurality of guiding grooves 65 (U-shaped grooves) is between the flexible walls 64, and each of the second engaging portions 63 is at an inner side of a corresponding one of the flexible walls 64. After the optical-fiber connector 100 is inserted into the receiving groove 60 of the protective cap 6, each of the first engaging portions 43 of the connector body 4 is engaged with the corresponding one of the second engaging portions 63. Under this condition, through the configuration of the guiding grooves 65 at two sides of the protective cap 6, the flexible walls 64 at the two sides of the protective cap 6 are flexible and swingable, and the flexible walls 64 can be bent and expanded outwardly (as shown in FIG. 7 and FIG. 8). Therefore, the distance between the flexible walls 64 can be increased, thereby facilitating in the assembling of the protective cap 6 and the connector body 4.

Please refer to FIG. 2 and FIG. 4. In some embodiments, the flexible walls 64 of the protective cap 6 comprise a plurality of thicker portions 641 and a plurality of thinner portions 642. In each of the flexible walls 64, the thinner portions 642 are at two sides of the thicker portion 641 and adjacent to the guiding grooves 65. Through the configuration of the thinner portions 642 of the flexible walls 64, the flexible walls 64 at the two sides of the protective cap 6 are flexible and swingable. Therefore, the distance between the flexible walls 64 can be increased, thereby facilitating in the assembling of the protective cap 6 and the connector body 4.

Please refer to FIG. 3, FIG. 7, and FIG. 8. FIG. 7 illustrates a cross-sectional view along the line B-B shown in FIG. 5. FIG. 8 illustrates a cross-sectional view showing the connector body 4 is detached from the protective cap 6 from the viewing angle of FIG. 7. In some embodiments, an outer end of the insertion opening 62 has a plurality of guiding portions 622, each of the guiding portions 622 is at an outer end portion of a corresponding one of the flexible walls 64, a side portion of each of the first engaging portions 43 has a chamfered structure 432, and each of the chamfered structures 432 contacts a corresponding one of the guiding portions 622. Therefore, the guiding portions 622 and the chamfered structures 432 are guided and in contact with each other, thereby facilitating in the assembling of the protective cap 6 and the connector body 4.

Please refer to FIG. 3, FIG. 7, and FIG. 8. In some embodiments, each of two sides of each of the curved recesses 631 of the protective cap 6 has a guiding bevel 632, and each of the guiding bevels 632 contacts a corresponding one of the curved protrusions 431. Therefore, the guiding bevels 632 and the curved protrusions 431 are guided by and in contact with each other, thereby facilitating in the assembling and disassembling of the protective cap 6 and the connector body 4.

Please refer to FIG. 7 and FIG. 8. In some embodiments, each of the first engaging portions 43 is detachably engaged with the corresponding one of the second engaging portions 63 through an axial rotational operation of the connector body 4. Therefore, each of the first engaging portions 43 is rotated from an engaged position P1 (the position where the first engaging portion 43 corresponds to the corresponding one of the second engaging portions 63 at the inner side of a corresponding one of the flexible walls 64) to a detached position P2 (where the first engaging portion 43 corresponds to a corresponding one of the guiding grooves 65). When the connector body 4 is to be detached from the protective cap 6, the protective cap 6 is rotated by 90 degrees, the guiding bevels 632 at the two sides of the curved recesses 631 of the second engaging portions 63 contact edge portions of the curved protrusions 431 of the first engaging portions 43, so that the connector body 4 is rotated with respect to the protective cap 6 to allow the flexible walls 64 to be bent and expanded outwardly, thus allowing the connector body 4 and the protective cap 6 to be detached from each other easily. Conversely, when the connector body 4 is to be assembled with the protective cap 6, the guiding bevels 632 and the curved protrusions 431 are guided by and in contact with each other, so that the protective cap 6 can be rotated by 90 degrees easily, thus allowing each of the curved protrusions 431 to be engaged with the corresponding one of the curved recesses 631.

Figure 9:
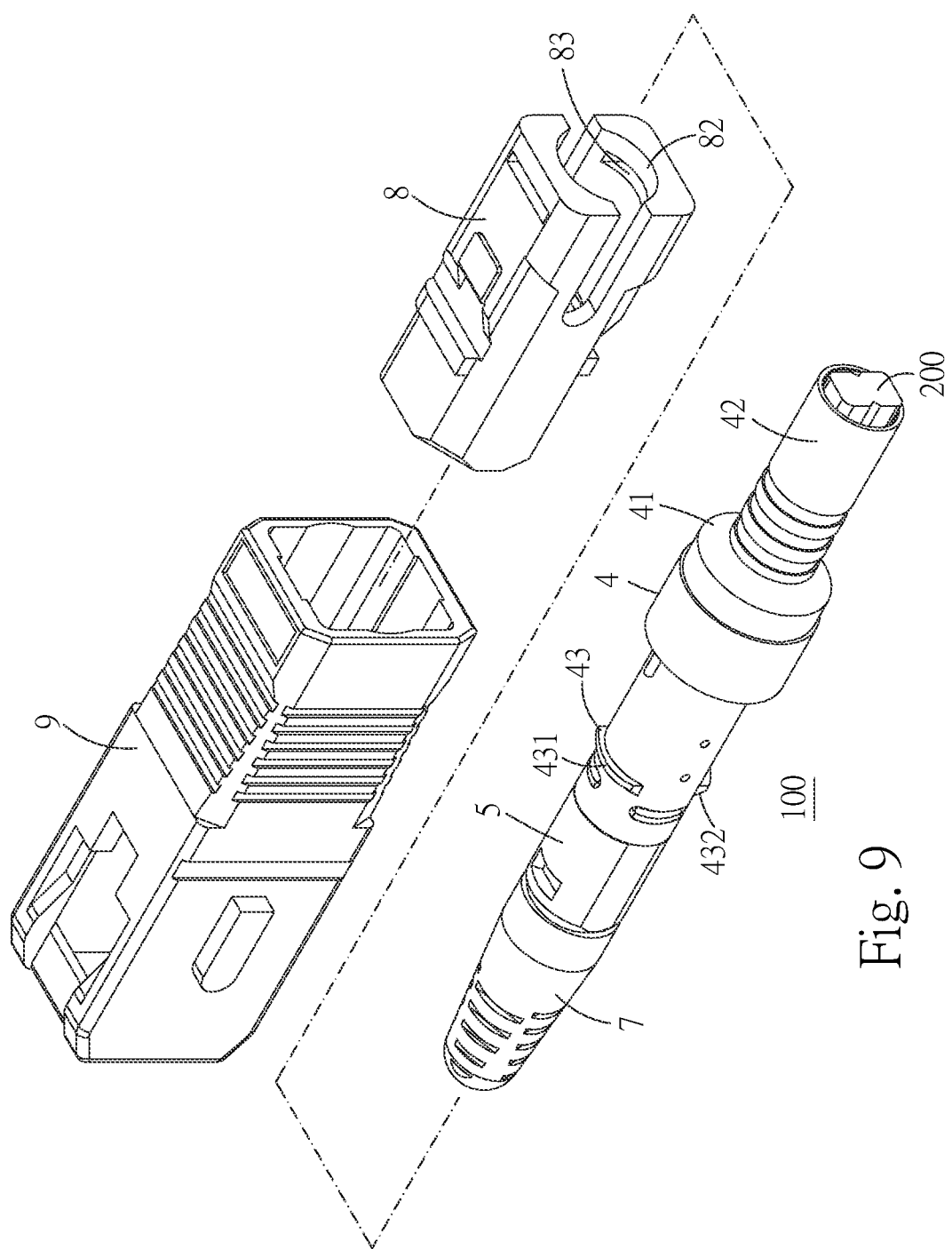
FIG. 9 illustrates an exploded view of an assembly of the optical-fiber connector, a fixation sleeve, and a coupling cap according to some embodiments of the instant disclosure, where the protective cap is removed.
Figure 10:
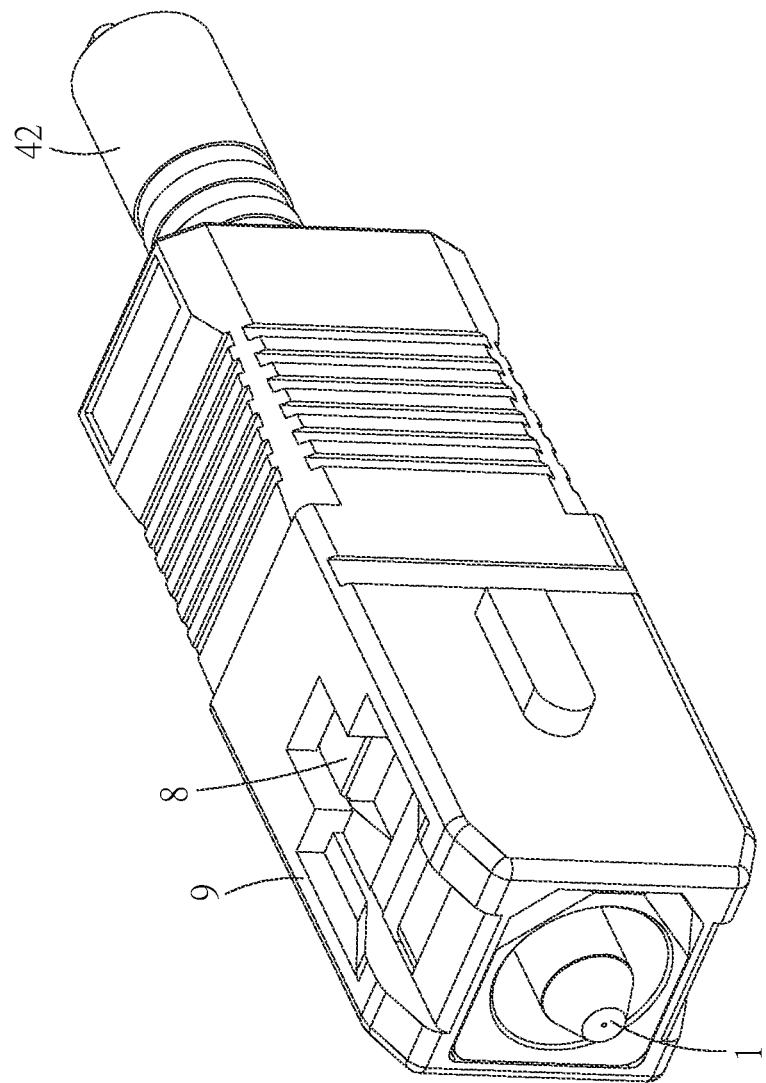
FIG. 10 illustrates a perspective view showing the optical-fiber connector, the fixation sleeve, and the coupling cap are assembled with each other according to some embodiments of the instant disclosure, where the dustproof cap is removed.
Figure 10:
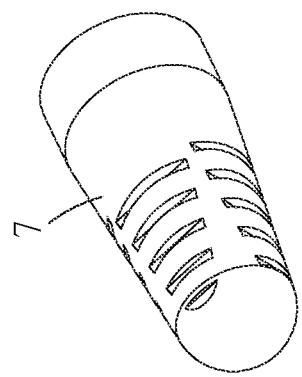
Figure 11:
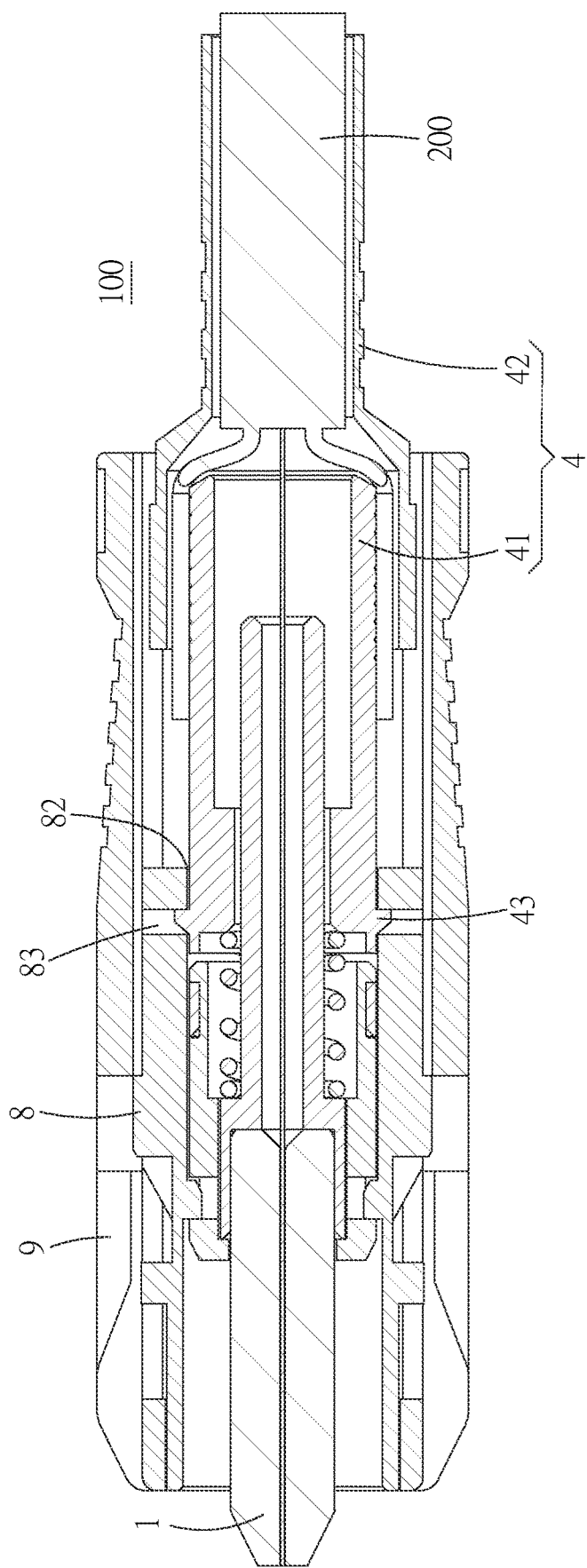
FIG. 11 illustrates a cross-sectional view showing the optical-fiber connector, the fixation sleeve, and the coupling cap are assembled with each other according to some embodiments of the instant disclosure.

Please refer to FIG. 9, FIG. 10, and FIG. 11. FIG. 9 illustrates an exploded view of an assembly of the optical-fiber connector 100, a fixation sleeve 8, and a coupling cap 9. FIG. 10 illustrates a perspective view showing the optical-fiber connector 100, the fixation sleeve 8, and the coupling cap 9 are assembled with each other. FIG. 11 illustrates a cross-sectional view showing the optical-fiber connector 100, the fixation sleeve 8, and the coupling cap 9 are assembled with each other. In some embodiments, because of the regulated sizes for the fixation sleeve 8 and the coupling cap 9, the fixation sleeve 8 and the coupling cap 9 cannot pass through the guiding pipeline for cable arrangement within the building construction; instead, after the optical-fiber connector 100 passes through the guiding pipeline, the optical-fiber connector 100 is assembled with the fixation sleeve 8 and the coupling cap 9. In some embodiments, after the optical-fiber connector 100 and the protective cap 6 pass through the guiding pipeline, the protective cap 6 is removed, and the optical-fiber connector 100 is assembled with the fixation sleeve 8 and the coupling cap 9 to form a standard connector (SC). After the optical-fiber connector 100 is assembled with the fixation sleeve 8 and the coupling cap 9, the dustproof cap 7 is detached from the assembly.

Please refer to FIG. 9, FIG. 10, and FIG. 11. In some embodiments, the fixation sleeve 8 has a mating opening 82, and an inner wall of the mating opening 82 has a plurality of mating portions 83. The fixation sleeve 8 is fitted over the optical-fiber sleeve member 1, the fixation member 2, and the connector body 4, and each of the mating portions 83 of the fixation sleeve 8 is engaged with a corresponding one of the first engaging portions 43 of the connector body 4.

Please refer to FIG. 9, FIG. 10, and FIG. 11. In some embodiments, the first engaging portions 43 at two sides of the connector body 4 not only can be engaged with the protective cap 6 but also can be engaged with the fixation sleeve 8. The engagement manner between the connector body 4 and the protective cap 6 may be the same as the engagement manner between the connector body 4 and the fixation sleeve 8. After these components are engaged with each other, the entire rigidity of the engaged assembly is increased.

Based on the above, according to some embodiments of the instant disclosure, after assembling the protective cap with the optical-fiber connector, the protective cap and the optical-fiber connector are drawn by tools to pass through the guiding pipeline to achieve the drawing of the optical-fiber connector. According to some embodiments, each of the second engaging portions of the protective cap is engaged with the corresponding one first engaging portion of the connector body, so that the protective cap and the optical-fiber connector are assembled to be an assembly. Therefore, the structural strength and the product rigidity of the assembly can be increased, so that the assembly can bear the pulling force upon the assembly is pulled to have a long-distance movement. According to some embodiments, upon assembling the protective cap to the optical-fiber connector, the dustproof cap on the optical-fiber connector does not need to be detached and is assembled in the protective cap. Therefore, the assembling of the protective cap and the optical-fiber connector is convenient. According to some embodiments, after the optical-fiber connector is assembled with the protective cap, the outer diameter of the cross sectional of the assembly can be reduced efficiently. Therefore, the assembly is small and has a smaller space ratio, and the optical-fiber connector can pass through a guiding pipeline have an outer diameter of 6.5 mm.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical-fiber connector with protective cap, comprising:
   an optical-fiber sleeve member;
   a fixation member, wherein the optical-fiber sleeve member is connected to one end of the fixation member;
   a spring fitted over the fixation member;
   a connector body fitted over the fixation member and the spring, wherein the connector body has a plurality of first engaging portions;
   a retaining member fitted over the optical-fiber sleeve member and engaged with the connector body;
   a protective cap having a receiving groove, wherein one of two ends of the protective cap has a connection portion, and the other end of the protective cap has an insertion opening; an inner wall of the insertion opening has a plurality of second engaging portions, the protective cap is fitted over the optical-fiber sleeve member, the retaining member, and the connector body, and each of the second engaging portions is engaged with a corresponding one of the first engaging portions; and
   a dustproof cap, wherein the dustproof cap is fitted over the optical-fiber sleeve member, and one end of the dustproof cap contacts an inner wall of the receiving groove of the protective cap.

2. The optical-fiber connector with protective cap according to claim 1, wherein each of two sides of the inner wall of the insertion opening comprises a flexible wall, a plurality of guiding grooves is between the flexible walls, and each of the second engaging portions is at an inner side of a corresponding one of the flexible walls.

3. The optical-fiber connector with protective cap according to claim 2, wherein the flexible walls comprise a plurality of thicker portions and a plurality of thinner portions, in each of the flexible walls, the thinner portions are at two sides of the thicker portion and adjacent to the guiding grooves.

4. The optical-fiber connector with protective cap according to claim 3, wherein each of the first engaging portions is a curved protrusion, and each of the second engaging portions is a curved recess; each of the curved recesses is at an inner side of a corresponding one of the flexible walls, and each of the curved protrusions is engaged with a corresponding one of the curved recesses.

5. The optical-fiber connector with protective cap according to claim 4, wherein each of two sides of each of the curved recesses has a guiding bevel, and each of the guiding bevels contacts a corresponding one of the curved protrusions.

6. The optical-fiber connector with protective cap according to claim 4, wherein each of the first engaging portions is detachably engaged with the corresponding one of the second engaging portions through an axial rotational operation of the connector body, so that each of the first engaging portions is rotated from an engaged position to a detached position; when each of the first engaging portions is at the engaged position, the first engaging portion corresponds to the corresponding one of the second engaging portions which is at the inner side of a corresponding one of the flexible walls, and when each of the first engaging portions is at the detached position, the first engaging portion corresponds a corresponding one of the guiding grooves.

7. The optical-fiber connector with protective cap according to claim 2, wherein an outer end of the insertion opening has a plurality of guiding portions, each of the guiding portions is at an outer end portion of a corresponding one of the flexible walls, a side portion of each of the first engaging portions has a chamfered structure, and each of the chamfered structures contacts a corresponding one of the guiding portions.

8. An optical-fiber connector with protective cap, comprising:
an optical-fiber sleeve member;
a fixation member, wherein the optical-fiber sleeve member is connected to one end of the fixation member;
a spring fitted over the fixation member;
a connector body fitted over the fixation member and the spring, wherein the connector body has a plurality of first engaging portions;
a retaining member fitted over the optical-fiber sleeve member and engaged with the connector body;
a protective cap having a receiving groove, wherein one of two ends of the protective cap has a connection portion, and the other end of the protective cap has an insertion opening; an inner wall of the insertion opening has a plurality of second engaging portions, the protective cap is fitted over the optical-fiber sleeve member, the retaining member, and the connector body, and each of the second engaging portions is engaged with a corresponding one of the first engaging portions,
wherein each of two sides of the inner wall of the insertion opening comprises a flexible wall, a plurality of guiding grooves is between the flexible walls, and each of the second engaging portions is at an inner side of a corresponding one of the flexible walls.

9. The optical-fiber connector with protective cap according to claim 8, wherein the flexible walls comprise a plurality of thicker portions and a plurality of thinner portions, in each of the flexible walls, the thinner portions are at two sides of the thicker portion and adjacent to the guiding grooves.

10. The optical-fiber connector with protective cap according to claim 9, wherein each of the first engaging portions is a curved protrusion, and each of the second engaging portions is a curved recess; each of the curved recesses is at an inner side of a corresponding one of the flexible walls, and each of the curved protrusions is engaged with a corresponding one of the curved recesses.

11. The optical-fiber connector with protective cap according to claim 10, wherein each of two sides of each of the curved recesses has a guiding bevel, and each of the guiding bevels contacts a corresponding one of the curved protrusions.

12. The optical-fiber connector with protective cap according to claim 10, wherein each of the first engaging portions is detachably engaged with the corresponding one of the second engaging portions through an axial rotational operation of the connector body, so that each of the first engaging portions is rotated from an engaged position to a detached position; when each of the first engaging portions is at the engaged position, the first engaging portion corresponds to the corresponding one of the second engaging portions which is at the inner side of a corresponding one of the flexible walls, and when each of the first engaging portions is at the detached position, the first engaging portion corresponds a corresponding one of the guiding grooves.

13. The optical-fiber connector with protective cap according to claim 8, wherein an outer end of the insertion opening has a plurality of guiding portions, each of the guiding portions is at an outer end portion of a corresponding one of the flexible walls, a side portion of each of the first engaging portions has a chamfered structure, and each of the chamfered structures contacts a corresponding one of the guiding portions.

14. An optical-fiber connector with protective cap, comprising:
an optical-fiber sleeve member;
a fixation member, wherein the optical-fiber sleeve member is connected to one end of the fixation member;
a spring fitted over the fixation member;
a connector body fitted over the fixation member and the spring, wherein the connector body has a plurality of first engaging portions;
a retaining member fitted over the optical-fiber sleeve member and engaged with the connector body;
a protective cap having a receiving groove, wherein one of two ends of the protective cap has a connection portion, and the other end of the protective cap has an insertion opening; an inner wall of the insertion opening has a plurality of second engaging portions, the protective cap is fitted over the optical-fiber sleeve member, the retaining member, and the connector body, and each of the second engaging portions is engaged with a corresponding one of the first engaging portions,
wherein the receiving groove of the protective cap is cone-shaped, and a diameter of the insertion opening gradually decreases toward an interior of the receiving groove.

* * * * *